United States Patent [19]

Kitrell

[11] 4,113,351

[45] Sep. 12, 1978

[54] SAFETY REFLECTOR DEVICE FOR BICYCLES OR THE LIKE

[76] Inventor: John V. Kitrell, 1830 N. 49th, Lincoln, Nebr. 68504

[21] Appl. No.: 730,695

[22] Filed: Oct. 7, 1976

[51] Int. Cl.² .............................................. G02B 5/12
[52] U.S. Cl. ................ 350/99; 280/289 R; 350/97
[58] Field of Search ............... 350/97, 95, 99, 105, 350/306, 309, 300, 50, 58, 60, 70, 293; 296/89; 40/129 B; 301/37 R, 37 S; D10/111; 116/36

[56] References Cited

U.S. PATENT DOCUMENTS

| 2,078,103 | 4/1937 | Simmons | 350/98 |
| 2,645,977 | 7/1953 | Wilford | 350/97 |
| 2,852,886 | 9/1958 | Parker | 350/98 |
| 3,945,337 | 3/1976 | Sweetman | D10/111 |

FOREIGN PATENT DOCUMENTS 26,123 of 1913 United Kingdom ..................... 350/98

*Primary Examiner*—John K. Corbin
*Assistant Examiner*—B. W. de los Reyes
*Attorney, Agent, or Firm*—Zarley, McKee, Thomte, Voorhees & Sease

[57] ABSTRACT

A safety reflector device for bicycles or the like comprising a plurality of substantially U-shaped members having first and second ends. The U-shaped members have a light reflective surface on at least one side thereof. First and second connectors pivotally connect the first and second ends of the U-shaped members together respectively. The U-shaped members may be pivotally moved relative to each other from a closed super-imposed position to an open position. When in the open position, the U-shaped members are spaced from one another and suggest a large mass with depth, height and breadth when subjected to a light source. A support member is operatively connected to the U-shaped members for mounting the device on the forward and rearward portions of the bicycle.

4 Claims, 8 Drawing Figures

U.S. Patent        Sept. 12, 1978        4,113,351
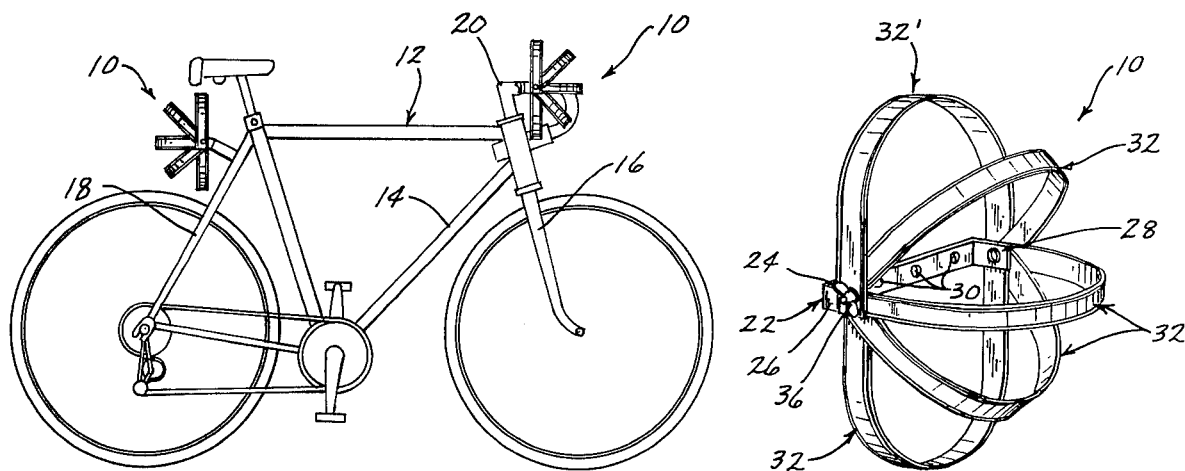
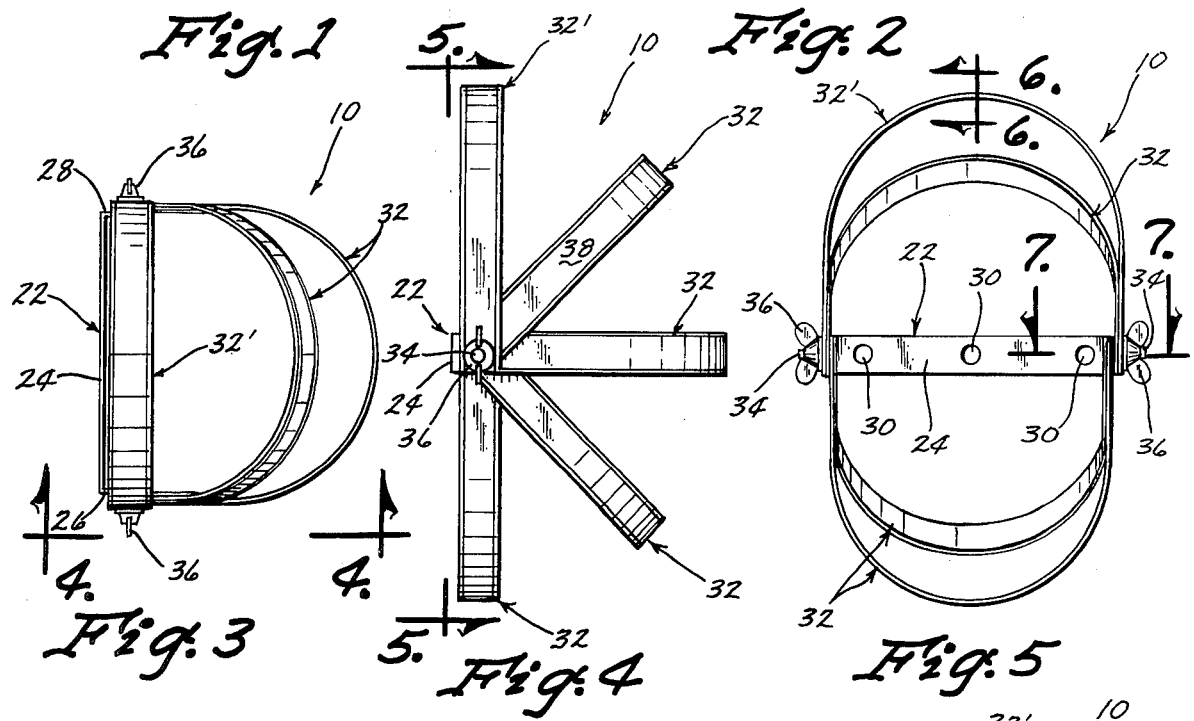
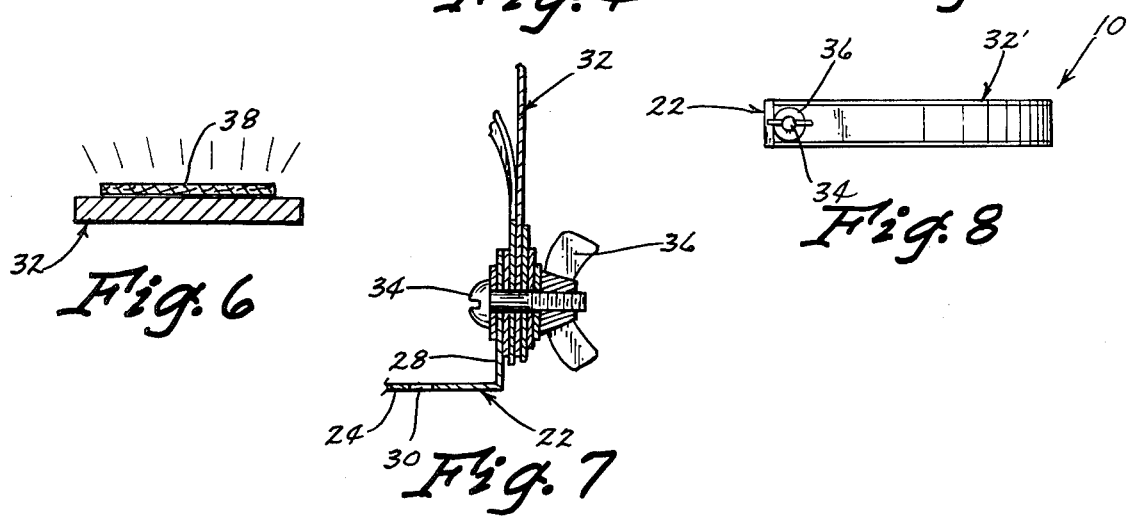

SAFETY REFLECTOR DEVICE FOR BICYCLES OR THE LIKE

BACKGROUND OF THE INVENTION

This invention relates to a safety reflector device and more particularly to a reflector device which provides a light gathering area which simulates mass when viewed from a distance while being influenced by an artificial light source but which makes a transition into an identifiable pattern as the distance between the reflector and the viewer closes. Additionally, the invention relates to a device which may be reducible in size for storage or handling when not in use.

Heretofore, various types and sizes of reflective materials have been assembled into devices to provide protection during darkness for objects to which they are attached when these objects are subjected to a light source from approaching vehicles. When such prior devices have been used previously, the mass described by the reflected light, when viewed from a distance, has been on a one-to-one ratio with the area of the reflective material presented by the devices. Thus, the prior devices presented a continuous source of compromise between desired adequate illumination and practicality of such a device from the standpoint of cost, size, appearance in daylight, and general consumer acceptability.

The above-described difficulties have been particularly relevant in the design and general use of such devices on cycles such as bicycles or the like which, by their very nature, should require a large display of illumination when operated during hours of darkness but due to the petite size of the structural members of the machine, good taste dictates a restriction on the size of any device attached thereto as when viewed in the daylight.

Applicant has previously devised a fan-shaped reflector device for bicycles which represented a distinct improvement in the art and the device is the subject of the patent application filed June 1, 1976 under Ser. No. 691,822 now Pat. No. 4,046,397. Although the device of the previous application was extremely satisfactory, it has been found that the instant invention provides a three-dimensional reflective effect.

Therefore, it is a principal object of the invention to provide an improved safety reflector device.

A further object of the invention is to provide a safety reflector device which provides a large reflective mass when viewed by night but which is convertible to a small esthetically acceptable device when viewed in daylight.

A further object of the invention is to provide a safety reflector device for use with bicycles wherein a three-dimensional reflective surface is provided. A further object of the invention is to provide a safety reflector device for bicycles which provides a highly reflective surface visible at various angles with respect thereto.

A further object of the invention is to povide a safety reflector device which is economical to manufacture, durable in use and refined in appearane.

BRIEF DESCRIPTION OF THE DRAWINGS

FIG. 1 is a side view of a bicycle having a pair of the safety reflector devices mounted thereon:

FIG. 2 is a front perspective view of the safety reflector device:

FIG. 3 is a top view of the safety reflector device:

FIG. 4 is a side view of the safety reflector device:

FIG. 5 is a front view of the safety reflector device:

FIG. 6 is an enlarged sectional view as seen on lines 6—6 of FIG. 5:

FIG. 7 is an enlarged sectional view as seen on lines 7—7 of FIG. 5; and

FIG. 8 is a side view of the device in a closed position.

SUMMARY OF THE INVENTION

A safety reflector device which may be mounted on either the forward or rearward ends of the bicycle or the like to present a large reflective mass when subjected to light from automobile headlights or the like. The device includes a support member which may be secured to either the forward or rearward ends of the bicycle. A plurality of substantially U-shaped members are pivotally connected at the opposite ends thereof to the supporting member and are adapted to be moved from a closed superimposed position relative to each other to an open or spaced apart condition. The U-shaped members have light reflective material on one side thereof so as to present a large reflective mass when viewed from a distance but which becomes an identifiable object as the light source approaches the device. The device presents a three-dimensional reflective mass when subjected to a light source.

DESCRIPTION OF THE PREFERRED EMBODIMENT

The numeral 10 refers generally to the reflector device of this invention while the numeral 12 refers to a bicycle including a frame 14, front fork 16, rear fork 18 and handle bar assembly 20.

Reflector device 10 generally comprises a U-shaped support 22 comprising a base portion 24 and opposite ends 26 and 28. Base portion 24 is provided with a plurality of openings 30 formed therein to facilitate attaching the device to the bicycle by any convenient means. Support 22 may be of any convenient construction as long as it provides a means for rotatably connecting the ends of the reflector members thereto and provides a means for attaching the same to the bicycle.

A plurality of U-shaped reflector members or segments 32 are selectively rotatably mounted on the ends 26. The opposite ends of each of the reflector members 32 are provided with openings formed therein adapted to receive a bolt 34 extending through support 22 and the reflector members. A wing-nut 36 is mounted on each of the bolts 34 as illustrated in the drawings.

Each of the reflector members 32 is provided with a conventional reflective surface 38 on the outer surface thereof. The lengths of each of the reflector members 32 is such so as to permit it to be moved from the closed position of FIG. 8 to the open position of FIG. 4.

In normal operation, it is recommended that a reflector device 10 be mounted on the forward and rearward portions of the bicycle. For example, one of the reflector devices may be secured to the handlebear assembly 20 by means of bolts or the like extending through the support member 22 and being connected to the handlebar assembly. Likewise, the reflector device 10 may be secured to the rear fork 18 by any convenient means. If the bicycle has a support extending between the seat and the rear axle, the rear reflector device 10 may be secured to that support.

In normal daylight operation, the reflector device 10 would be positioned in the closed position of FIG. 8.

When the bicycle is going to be used at night, wing nuts 36 are loosened and the reflector members 52 are pivotally moved with respect to the support 22 to achieve the configuration seen in FIGS. 1-5. When the device 10 is in the configuration of FIGS. 1-5, the device will present a large reflective mass when viewed from a distance but will become a highly distinguishable object as the light source approaches the device. The reflective device provides a reflective mass when viewed from the left side, front side, right side and positions therebetween. In otherwords, the reflector device tends to provide a three-dimensional reflective mass.

Thus it can be seen that a novel saftey reflector device has been provided which occupies very little space when in the closed position but does provide a highy reflective mass when the reflective members are pivotally moved to the open position illustrated in FIGS. 1-5. Therefore it can be seen that the reflector device of this invention accomplishes at least all of its stated objectives.

I claim:

1. A safety reflector device, comprising,
a plurality of substantially U-shaped members having first and second ends, said members having a light reflective surface on the outer surface,
first connection means connecting the first ends of said U-shaped members,
second connection means connecting the second ends of the said U-shaped members,
said U-shaped members being positioned relative to each other so that the majority of the lengths thereof are spaced apart.

2. The device of claim 1 wherein said members are flat.

3. The device of claim 1 wherein said first and second connection means selectively pivotally secures the ends of said members together so that said members may be positioned in a nested inoperative position.

4. In combination,
a bicycle, at least one safety reflector device mounted on said bicycle, said reflector device comprising a plurality of substantially U-shaped members having first and second ends, said members having a light reflective surface on the outer surface, first connection means connecting the first ends of said U-shaped members, second connection means connecting the second ends of said
U-shaped members, said U-shaped members being positioned relative to each other so that the majority of the lengths thereof are spaced apart,
said device presenting a light reflective surface from at least
three directions with respect to said bicycle.

* * * * *